United States Patent [19]
Dohnert

[11] 3,929,640
[45] Dec. 30, 1975

[54] WATER TREATING APPARATUS
[75] Inventor: Edward H. Dohnert, East Brunswick, N.J.
[73] Assignee: Ecodyne Corporation, Chicago, Ill.
[22] Filed: Apr. 27, 1972
[21] Appl. No.: 248,231

[52] U.S. Cl. ............... 210/195; 210/207; 210/519; 210/528
[51] Int. Cl.² ..................... C02B 1/10; B01D 19/04
[58] Field of Search ......... 210/14, 55, 74, 188, 194, 210/195, 207, 519, 521–523, 525, 528, 538

[56] References Cited
UNITED STATES PATENTS

| | | | |
|---|---|---|---|
| 2,422,258 | 6/1947 | Prager | 210/55 |
| 2,638,444 | 5/1953 | Kappe | 210/194 |
| 3,397,788 | 8/1968 | Duff et al | 210/528 X |
| 3,473,665 | 10/1969 | Duff | 210/528 X |

Primary Examiner—Charles N. Hart
Assistant Examiner—Robert H. Spitzer
Attorney, Agent, or Firm—Hume, Clement, Brinks, Willian, Olds & Cook, Ltd.

[57] ABSTRACT

A water treating apparatus into which improved mixing and flow mechanisms are incorporated. A plurality of upwardly directed nozzles force influent through a flow control zone including a plurality of apertures which permit excess flow to join the influent and through a preliminary mixing zone including baffles before the influent enters the mixing and recirculation zone.

10 Claims, 1 Drawing Figure

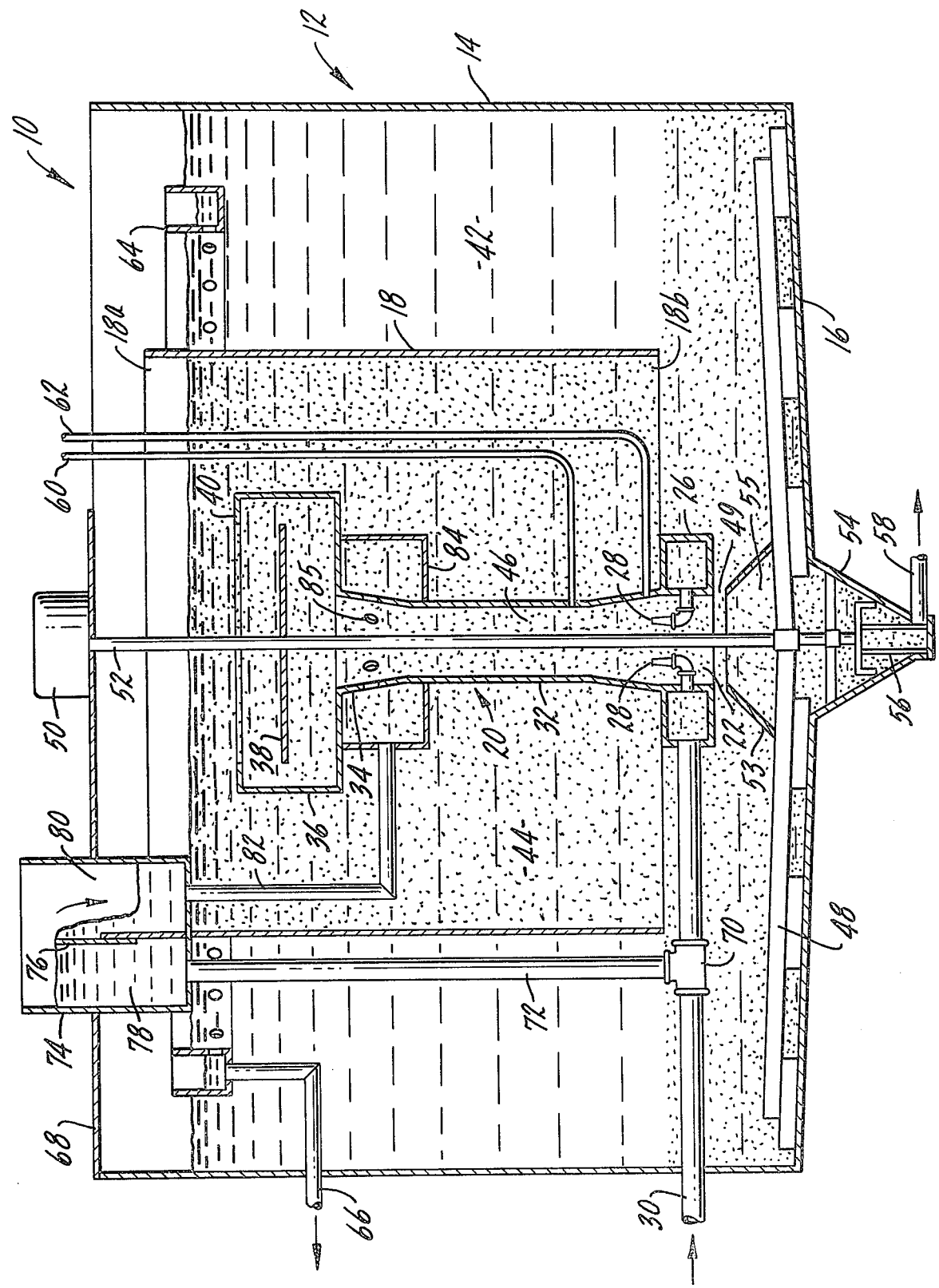

WATER TREATING APPARATUS

BACKGROUND OF THE INVENTION

The present invention relates to improvements in the art of liquid flow control, and more specifically to a water treating apparatus incorporating improved flow means.

A particularly successful apparatus for the purification of water is described and claimed in U.S. Pat. No. 3,397,788, which is assigned to the assignee of this application. Basically, this device comprises means forming a plurality of water treating zones, means forming a settling zone, means forming a recirculation zone, and means forming an uptake zone. The bottom of the uptake zone is closed except for an opening substantially in the center through which it communicates with the mixing and recirculation zone and with the settling zone. The upper portion of the uptake zone communicates with the mixing and recirculation zone, and the mixing and recirculation zone, in turn, communicates with the settling zone. The apparatus includes means for supplying a coagulant into the uptake zone and means for withdrawing effluent liquid from the settling zone. In order to achieve swirling within the uptake zone, together with high recirculation rates in comparison with the total throughput rate of the apparatus, the uptake zone includes at least one, and preferably a plurality of nozzles through a liquid input conduit.

U.S. Pat. No. 3,473,665, which is assigned to the assignee of this application improved upon the device shown in U.S. Pat. No. 3,397,788 by providing flow control means to decrease its sensitivity to input flow variances. In one embodiment of the invention, a flow control tank is employed having an internal weir outlet compartment. The weir has an upper edge above the level of the nozzle. A flow control inlet conduit connects the liquid input conduit to the inlet compartment of the tank, and a flow control outlet conduit connects the outlet compartment with the interior of the water treating apparatus. Thus, when the input pressure exceeds the pressure head represented by the height of the weir, the input liquid will flow over the top of the weir, bypassing the nozzles, passing directly to the interior of the water treating apparatus.

Both of the devices described in the aforesaid patents forced water through an uptake zone by positioning nozzles to cause rotation of the uptake water. The rotation of the water causes a high pressure zone toward the periphery of the uptake zone and a low pressure zone toward the center of the uptake zone. Such movement causes recirculation of precipitates and pumping of the water to a mixing and recirculation zone. However, the nozzles could not always be relied upon and at times an auxiliary impeller had to be provided to increase the efficiency of the nozzles.

SUMMARY OF THE INVENTION

This invention presents an improved water treatment apparatus. In one aspect of this invention a plurality of upwardly directed nozzles are positioned within the perimeter of the lower opening of the uptake zone. As a consequence the fluid does not move through the uptake zone by virtue of rotational motion and the need for auxiliary impellers is eliminated. In another aspect of this invention the low velocity flow control discharge is placed into the uptake zone through a plurality of holes in the uptake column. A further aspect of this invention is improved mixing by utilizing an interior disc-like baffle and an annular baffle at or near the upper opening of the uptake zone.

BRIEF DESCRIPTION OF THE DRAWINGS

The features of this invention will become more apparent in the following detailed description when read in conjunction with the drawing which is a vertical cross-sectional view of a water treating apparatus embodying the features of the invention.

DETAILED DESCRIPTION OF THE PREFERRED EMBODIMENT

Referring to the drawing, there is illustrated a water treating apparatus, generally indicated by reference numeral 10, embodying the features of the present invention. The apparatus 10 is of the type well known in the art for softening water by the cold lime-soda ash process, and for the clarification of waters containing suspended solids, color, and organic impurities by coagulation with alum or ferric sulfate or other coagulants. Coagulation and softening may be carried out simultaneously in this type of water treating apparatus. The coagulants or precipitates formed within the apparatus have a tremendous surface area upon which the dissolved or colloidally disperesed impurities are absorbed. The suspended impurities are surrounded by the gelatinous precipitates and themselves become part of the precipitate.

To soften water by this process, lime (calcium hydroxide) is added to precipitate the calcium bicarbonate as calcium carbonate and the magnesium salts as magnesium hydroxide. Soda ash (sodium carbonate) is added to react with the calcium chloride and calcium sulfate originally present in the water as well as that formed by the reaction of lime with magnesium chloride and sulfate. The reaction of sodium carbonate with these salts forms calcium carbonate. Thus, the hardness (calcium and magnesium salts) originally present in the water is partially removed as the slightly soluble compounds, calcium carbonate and magnesium hydroxide, precipitate.

Usually a coagulant such as alum, sodium aluminate, or ferric sulfate is employed in the treatment to assist in the separation of the turbidity and precipitates formed from the water. If sterilization and reduction in organic matter are required, chlorine is also used in the treatment. By suitable modification in the chemical treatment, silica reduction can be obtained.

The water treating apparatus 10 comprises an open tank 12 having a cylindrical side wall 14 and a bottom 16. Mounted therein is an inverted, generally cylindrical partition member 18 having an upper opening 18a and a lower opening 18b.

An uptake member 20 is mounted within the partition 18. It includes a lower opening 22 and an annular distribution chamber 26 to which a plurality of nozzles 28 are connected. The nozzles 28 are directed straight up and although only two nozzles 28 are illustrated for sake of clarity, more could be used.

Untreated water is fed under pressure into the annular distribution chamber 26 through a liquid input conduit 30. The water is discharged upwardly through a cylindrical medial portion 32 of the uptake member 20. The water then passes through a frustoconical flow control portion 34. In an application that forms large amounts of precipitates an annular preliminary mixing portion 36 may be added to the uptake member 20. A horizontal disc-like baffle 38 and an annular baffle 40 assist in mixing the precipitates and water.

The partition member 18 and the tank 12 define an annular settling zone 42. The uptake member 20 and the partition member 18 define an annular mixing and recirculation zone 44. The uptake member 20 forms and uptake zone 46 which communicates at its upper opening 47 with the mixing and recirculation zone 44. The uptake zone 46 communicates with the lower portion of the settling zone 42 through the opening 49.

Mounted within the lower portion of the settling zone 42 is a scraper 48 which rotates to cover the entire bottom 16 of the tank 12. The scraper 48 is driven by a motor 50 mounted on top of the tank 12 through a drive shaft 52 which extends through the uptake zone 46.

A frusto-conical funnel member 53 is mounted on the scraper 48 and its lower opening 55 is directed toward a sludge pit 54. Recirculated precipitates pass upwardly through the funnel member 53, through the opening 49, and into the bottom of the uptake zone 46.

The sludge pit 54 is positioned centrally in the bottom 16 of the tank 12, and is below the funnel member 24. Sludge thickeners 56 are rotatably driven by the shaft 52 along with the scraper 48. Sludge is removed from the sludge pit 54 through a sludge removal line 58 as is well known in the art.

The upwardly directed nozzles 28 shoot the intake water upwardly. The nozzles are placed within the perimeter of the lower opening 22 to avoid the well-known whirlpool effect. In this manner, recirculated precipitates from the settling zone 42 are mixed with the influent water in the uptake zone 46. Chemical treating agents are added to the uptake zone 46 through chemical input lines 60, 62 and are mixed with the influent water in the uptake zone 46. Treated effluent water is recovered in the annular-shaped collector trough 64 and withdrawn through an effluent outlet line 66. The apparatus is accessible for service from a catwalk 68.

To maintain the flow through the nozzles 26 relatively constant, flow control means have been included in the preferred embodiment. A T-connection 70 is included in the intake line 30 to divert excess flow through an intake conduit 72 to a tank 74. Within the tank 74, a weir 76 is positioned, separating the tank 74 into an inlet compartment 78 and an outlet compartment 80. The outlet compartment 80 communicates with the interior of the water treating apparatus 10 through a flow control outlet conduit 82. The outlet conduit 82 communicates with an annular distribution chamber 84 which passes water into the uptake member 20 through a plurality of holes 85 formed in the perimeter of the flow control portion 34 of the uptake member 20. The weir 76 may be of adjustable height to control the pressure head in the inlet conduit 72.

During operation, the raw or influent water enters the apparatus 10 through the liquid input conduit 30. In this instance, it will be assumed that the pressure of the influent liquid is slightly greater than the pressure head corresponding to the height of the adjustable weir 76, as is normally true. A portion of the influent water is delivered to the annular distribution chamber 26 and the nozzles 28, which eject it into the uptake chamber 20. The influent water is mixed with the recirculated precipitates passing upwardly through the opening 49 at the bottom of the uptake zone 46. The influent water is also mixed with chemicals being added through the chemical input lines 60, 62 and additional precipitates are formed. The influent water is thereby pumped upwardly through the uptake zone 46 and passes over the top of the uptake member 20 into the mixing and recirculation zone 44, where further mixing of the water, precipitated solids, and chemicals occurs.

A substantial portion of the water and suspended precipitates will pass through the funnel member 53 and enter the uptake zone 46 through the opening 49 to be recirculated in the manner previously described, and as is well known in the art. Part of the water enters the settling zone 42 and rises toward the annular shaped collector trough 64. Precipitates settle out and fall to the bottom 16 of the tank 12.

The settled precipitates or sludge are moved continuously along the bottom 16 toward the center of the apparatus by means of the slowly rotating scraper 48, which covers the entire floor area. The accumulations of precipitates are transferred to the sludge pit 54 where they are deposited. The sludge is removed through the sludge removal line 58 and passed to waste. Clear water is collected in the trough 64 and is removed from the apparatus 10 through the outlet line 66.

The remaining liquid that is not delivered to the annular distribution chamber 26 passes through the flow control inlet conduit 72, where it flows over the weir 76 and into the flow control outlet conduit 82. From the flow control outlet conduit 82 it passes through the distribution chamber 84 and through the holes 85 in the flow control zone 34. At this point, this portion of the raw water is mixed with the water that has been delivered to the uptake zone 46 through the nozzles 28, as well as with precipitated particles and chemicals which are also in the uptake zone 46.

If the input flow rate in the liquid input conduit 30 is increased, the pressure drop at the nozzles 28, as well as the flow rate through the nozzles 28 will increase only by a very small amount. The remainder of the increased flow will pass through the flow control inlet conduit 72 and over the weir as previously described. If it is desired to alter the flow rate and pressure drop at the nozzles 28 it is simply necessary to adjust the height of the weir. Thus, so long as the input pressure in the liquid input conduit 30 is at least equal to the pressure head represented by the height of the weir 76, a constant recirculation rate is achieved regardless of the total rate of input flow.

What is claimed is:

1. The water treating apparatus comprising:
   a tank;
   a partition within said tank defining a settling zone;
   means for removing treated water from said settling zone;
   an uptake member within said partition defining a mixing and recirculation zone, said uptake member including a lower opening;
   a plurality of upwardly directed nozzles connected to an intake means, said nozzles being disposed within said uptake member and within the perimeter of said lower opening in said uptake member; and
   precipitate collecting means underlying said lower opening whereby precipitates from said collecting means are mixed with liquid passing through said nozzles in said uptake member and are passed into said mixing and recirculation zone.

2. The apparatus set forth in claim 1 further comprising a rotatable rake disposed at the bottom of said tank for moving precipitates to said collecting means and means for removing said precipitates from said collecting means.

3. The water treating apparatus comprising:
a tank;
a partition within said tank defining a settling zone;
an uptake member within said partition defining a mixing and recirculation zone, said uptake member including a lower opening;
a plurality of upwardly directed nozzles connected to an intake means, said nozzles being disposed within said uptake member and within the perimeter of said lower opening in said uptake member;
precipitate collecting means underlying said lower opening whereby precipitates from said collecting means are mixed with liquid passing through said nozzles in said uptake member and are passed into said mixing and recirculation zone;
a flow control chamber;
a flow control inlet conduit communicating with said intake means and said flow control chamber;
a flow control outlet conduit communicating with said flow control chamber at a plurality of apertures in said uptake member.

4. The apparatus set forth in claim 3 wherein said flow control outlet conduit communicates with an annular distribution chamber disposed around the apertured portion of said uptake member.

5. The apparatus set forth in claim 4 further comprising a rotatable rake disposed at the bottom of said tank for moving precipitates to said collecting means and means for removing said precipitates from said collecting means.

6. The water treating apparatus comprising:
a tank;
a partition within said tank defining a settling zone;
means for removing treated water from said settling zone;
an uptake member within said partition defining a mixing and recirculation zone, said uptake member including a lower opening, a medial uptake zone and an upper preliminary mixing zone;
baffle means disposed in said preliminary mixing zone;
a plurality of upwardly directed nozzles connected to an intake means, said nozzles being disposed within said uptake member and within the perimeter of said lower opening in said uptake member;
precipitate collecting means underlying said lower opening whereby precipitates from said collecting means are mixed with liquid passing through said nozzles in said uptake member and are passed through said preliminary mixing zone into said mixing and recirculation zone.

7. The apparatus set forth in claim 6 wherein said baffle means comprises an annular baffle disposed at the top of said uptake member.

8. The apparatus set forth in claim 6 wherein said baffle means comprises a horizontal disc-like baffle disposed within said preliminary mixing zone.

9. The apparatus set forth in claim 6 wherein said baffle means comprises a horizontal disc-like baffle disposed within said preliminary mixing zone and an annular baffle disposed at the top of said uptake member.

10. The apparatus set forth in claim 9 further comprising a rotatable rake disposed at the bottom of said tank for moving precipitates to said collecting means and means for removing said precipitates from said collecting means.

* * * * *

UNITED STATES PATENT OFFICE
CERTIFICATE OF CORRECTION

Patent No. 3,929,640   Dated December 30, 1975

Inventor(s) Edward H. Dohnert

It is certified that error appears in the above-identified patent and that said Letters Patent are hereby corrected as shown below:

Column 3, line 8, at the beginning of the line, "and" should read --an--; and in line 25, at the beginning of the line, "24" should read --53--.

Signed and Sealed this twenty-third Day of March 1976

[SEAL]

Attest:

RUTH C. MASON
*Attesting Officer*

C. MARSHALL DANN
*Commissioner of Patents and Trademarks*